US012774037B2

(12) United States Patent
Zhao et al.

(10) Patent No.: US 12,774,037 B2
(45) Date of Patent: Oct. 27, 2026

(54) VEHICLE ENGINE CABIN STRUCTURE AND VEHICLE

(71) Applicant: BYD COMPANY LIMITED, Shenzhen (CN)

(72) Inventors: Baoguang Zhao, Shenzhen (CN); Hongsheng Tian, Shenzhen (CN); Tengyong Liu, Shenzhen (CN); Yanbing Yang, Shenzhen (CN); Yi Quan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 299 days.

(21) Appl. No.: 18/622,939

(22) Filed: Mar. 31, 2024

(65) Prior Publication Data

US 2024/0239415 A1 Jul. 18, 2024

Related U.S. Application Data

(63) Continuation of application No. PCT/CN2022/142834, filed on Dec. 28, 2022.

(30) Foreign Application Priority Data

Dec. 31, 2021 (CN) ......................... 202111676082.8

(51) Int. Cl.
*B62D 25/08* (2006.01)
*B60R 19/02* (2006.01)
(Continued)

(52) U.S. Cl.
CPC .......... *B62D 25/082* (2013.01); *B60R 19/023* (2013.01); *B60R 19/18* (2013.01); *B60R 19/34* (2013.01); *B60R 2021/0023* (2013.01)

(58) Field of Classification Search
CPC ...... B62D 21/15; B62D 21/152; B62D 25/08; B62D 25/082; B60R 19/24; B60R 19/26; B60R 19/18
(Continued)

(56) References Cited

U.S. PATENT DOCUMENTS 8,128,160 B2 * 3/2012 Leanza ................ B62D 25/088 296/203.02
9,260,138 B1 * 2/2016 Briceno ............... B62D 25/088
(Continued)

FOREIGN PATENT DOCUMENTS

BR 112015017653 A2 7/2017
CN 111409702 A 7/2020
(Continued)

OTHER PUBLICATIONS

The World Intellectual Property Organization (WIPO) International Search Report for PCT/CN2022/142834 Apr. 8, 2023 6 Pages (including translation).

*Primary Examiner* — Gregory A Blankenship
(74) *Attorney, Agent, or Firm* — Wenye Tan

(57) ABSTRACT

A vehicle front compartment structure and a vehicle. The vehicle front compartment structure includes a front anti-collision beam, a front longitudinal beam, an upper side beam, and an energy-absorbing box. A side of the energy-absorbing box is connected to the front anti-collision beam. The front longitudinal beam and the upper side beam are separately connected to another side of the energy-absorbing box. A first force transmission structure is formed through the front anti-collision beam, the energy-absorbing box, and the upper side beam. A second force transmission structure is formed through the front anti-collision beam, the energy-absorbing box, and the front longitudinal beam.

19 Claims, 7 Drawing Sheets

(51) Int. Cl.
*B60R 19/18* (2006.01)
*B60R 19/34* (2006.01)
*B60R 21/00* (2006.01)

(58) Field of Classification Search
USPC .................. 296/187.09, 187.1; 293/132, 133
See application file for complete search history.

(56) References Cited

U.S. PATENT DOCUMENTS

| | | | | |
|---|---|---|---|---|
| 9,381,949 | B2 * | 7/2016 | Briceno | B62D 25/082 |
| 9,446,725 | B2 * | 9/2016 | Yamada | B62D 25/082 |
| 10,787,202 | B2 * | 9/2020 | Kondo | B62D 21/15 |
| 12,187,345 | B1 * | 1/2025 | Hennessey | B62D 21/11 |
| 2007/0176443 | A1 * | 8/2007 | Yasuhara | B62D 21/152 293/133 |
| 2010/0259033 | A1 * | 10/2010 | Okabe | B60R 19/34 280/734 |
| 2015/0102636 | A1 * | 4/2015 | Cho | B62D 25/08 296/187.09 |
| 2015/0232050 | A1 * | 8/2015 | Yamada | B60R 19/34 296/187.1 |
| 2016/0039373 | A1 * | 2/2016 | Yamada | B60R 19/34 293/132 |
| 2016/0236718 | A1 | 8/2016 | Tatsuwaki et al. | |
| 2017/0008570 | A1 | 1/2017 | Mildner et al. | |
| 2017/0043810 | A1 * | 2/2017 | Kim | B62D 27/023 |
| 2017/0113735 | A1 * | 4/2017 | Kawabe | B60R 19/02 |
| 2017/0174265 | A1 | 6/2017 | Maruyama et al. | |
| 2017/0217501 | A1 * | 8/2017 | Takeda | B62D 21/02 |
| 2018/0178742 | A1 | 6/2018 | Hojo et al. | |
| 2020/0047696 | A1 | 2/2020 | Atsumi et al. | |
| 2021/0214010 | A1 * | 7/2021 | Atsumi | B62D 21/11 |
| 2023/0303177 | A1 * | 9/2023 | Yamanaka | B62D 21/152 |
| 2024/0239415 | A1 * | 7/2024 | Zhao | B60R 19/18 |

FOREIGN PATENT DOCUMENTS

| | | | |
|---|---|---|---|
| CN | 215284685 | U | 12/2021 |
| CN | 114954676 | A | 8/2022 |
| DE | 102020115391 | A1 | 5/2021 |
| JP | H10203411 | A | 8/1998 |
| JP | 2017114150 | A | 6/2017 |
| JP | 2017136947 | A | 8/2017 |
| JP | 2021109588 | A | 8/2021 |

* cited by examiner

VEHICLE ENGINE CABIN STRUCTURE AND VEHICLE

CROSS-REFERENCE TO RELATED APPLICATIONS

The present application is a continuation application of PCT application No. PCT/CN2022/142834, filed on Dec. 28, 2022, which claims priority to Chinese Patent Application No. 202111676082.8, filed on Dec. 31, 2021, and entitled "VEHICLE FRONT COMPARTMENT STRUCTURE AND VEHICLE". The entire content of all of the above-referenced applications is incorporated herein by reference.

FIELD

The present disclosure relates to a vehicle front compartment structure and a vehicle.

BACKGROUND

In the related art, compared with a front compartment structure of a conventional vehicle, a front compartment structure of a pure electric vehicle has two prominent problems in terms of safety. First, the pure electric vehicle is more afraid of a small-angle collision, for example, a 25% small-offset collision, because both an occupant and a battery module need to be protected after the collision. Longitudinal beams of a front compartment of the conventional vehicle are usually arranged as two parallel beam structures that extend in an X direction, and there is a large spacing between the two parallel beam structures. However, the pure electric vehicle usually uses a low profile tire because of a modeling trend. In this case, a spacing between root regions of the longitudinal beams is narrowed. This greatly impacts backward force transmission (to door sills and A-pillars of the vehicle) of the longitudinal beams. In addition, a rear end of an energy-absorbing box is directly connected to the longitudinal beam, an outer side of the longitudinal beam is vacant without additional force transmission structural member, and an upper side beam is lap-jointed behind a front vacant region of the longitudinal beam.

Second, the front compartment structure of the pure electric vehicle lacks natural physical defense. A conventional fuel vehicle usually uses a front-engine and front-wheel-drive design. When the conventional fuel vehicle encounters a frontal load, an engine, a water tank, a powertrain suspension structure, and the like that are arranged inside the front compartment may be used for resisting, to absorb some collision energy in a critical moment. However, an existing pure electric vehicle usually uses a rear-wheel-drive design in which there is a large empty space inside a front compartment, and tends to use a front storage compartment design. This structure loses natural physical defense compared with the conventional vehicle.

SUMMARY

Embodiments of the present disclosure provide improved technical solutions of a vehicle front compartment structure and a vehicle.

According to a first aspect of the present disclosure, a vehicle front compartment structure is provided, which includes: a front anti-collision beam; a front longitudinal beam; an upper side beam; and an energy-absorbing box, a side of the energy-absorbing box being connected to the front anti-collision beam, and the front longitudinal beam and the upper side beam being separately connected to another side of the energy-absorbing box; a first force transmission structure being formed through the front anti-collision beam, the energy-absorbing box, and the upper side beam; and a second force transmission structure being formed through the front anti-collision beam, the energy-absorbing box, and the front longitudinal beam.

According to a second aspect of the present disclosure, a vehicle is provided, which includes the vehicle front compartment structure according to the foregoing embodiment.

Other features and advantages of the present disclosure will become apparent from the following detailed description of example embodiments of the present disclosure with reference to the accompanying drawings.

BRIEF DESCRIPTION OF THE DRAWINGS

The accompanying drawings are incorporated into this specification and constitute a part of this specification, show embodiments of the present disclosure, and are used together with description thereof to describe the principle of the present disclosure.

DETAILED DESCRIPTION

Figure 1:
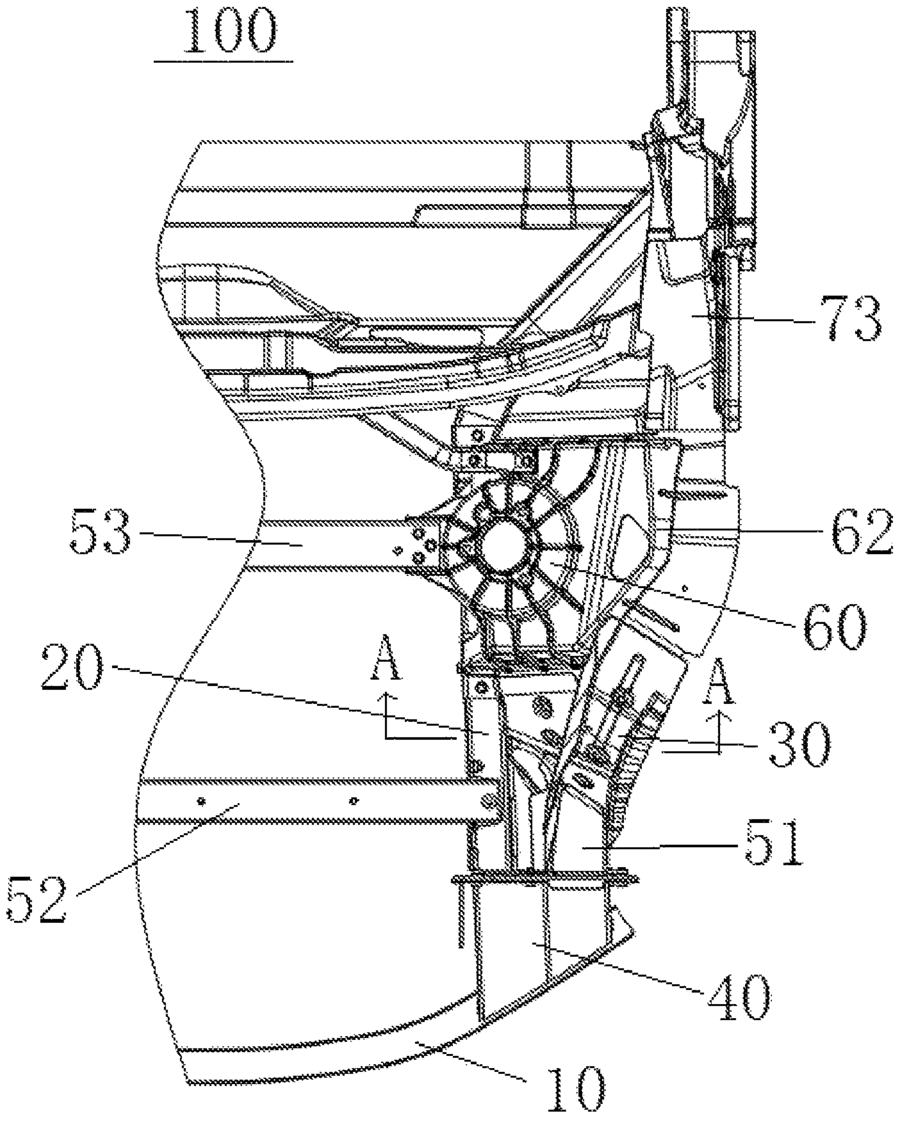
FIG. 1 is a top view of a vehicle front compartment structure according to an embodiment of the present disclosure.
Figure 2:
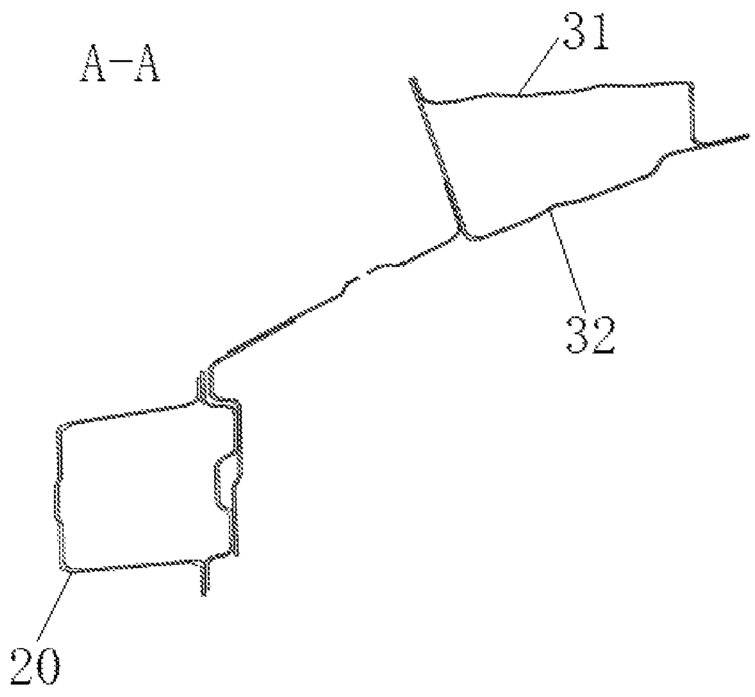
FIG. 2 is a cross-sectional view along a line A-A in FIG. 1.

Various example embodiments of the present disclosure are now described in detail with reference to the accompanying drawings. It should be noted that: unless otherwise specified, opposite arrangements, numerical expressions, and numerical values of components and steps described in the disclosure do not limit the scope of the present disclosure.

The following description of at least one example embodiment is merely illustrative, and in no way constitute any limitation on the present disclosure and application or use thereof.

In examples shown and discussed herein, any specific value should be construed as merely an example and not as a limitation.

It should be noted that: similar reference numerals and letters represent similar items in the accompanying drawings below. Therefore, once an item is defined in one accompanying drawing, the item does not need to be further discussed in subsequent accompanying drawings.

The following specifically describes, with reference to the accompanying drawings, a vehicle front compartment structure 100 according to an embodiment of the present disclosure.

As shown in FIG. 1 to FIG. 9, the vehicle front compartment structure 100 according to this embodiment of the present disclosure includes a front anti-collision beam 10, a front longitudinal beam 20, an upper side beam 30, and an energy-absorbing box 40.

Specifically, a side of the energy-absorbing box 40 is connected to the front anti-collision beam 10, and each front longitudinal beam 20 and each upper side beam 30 are separately connected to another side of the energy-absorbing box 40. A first force transmission structure is formed through the front anti-collision beam 10, the energy-absorbing box 40, and the upper side beam 30. A second force transmission structure is formed through the front anti-collision beam 10, the energy-absorbing box 40, and the front longitudinal beam 20.

In other words, refer to FIG. 1 to FIG. 4, the vehicle front compartment structure 100 according to this embodiment of the present disclosure is mainly applied to an electric vehicle, and the vehicle front compartment structure 100 mainly includes the front anti-collision beam 10, the front longitudinal beam 20, the upper side beam 30, and the energy-absorbing box 40. Two front longitudinal beams 20 are spaced apart on an inner side of the front anti-collision beam 10. An end of each upper side beam 30 is connected to the front anti-collision beam 10, and the other end of each upper side beam 30 extends toward an A-pillar 72, so that a force transmission channel is formed between the upper side beam 30 and the A-pillar 72. A side of the energy-absorbing box 40 is connected to the front anti-collision beam 10, and another side of the energy-absorbing box 40 is connected to each front longitudinal beam 20 and each upper side beam 30. Compared with the related art, in the present disclosure, widths of the front anti-collision beam 10 and the energy-absorbing box 40 in a Y direction are increased, to increase an area of a region in which the energy-absorbing box 40 overlaps with a collision barrier 80, and both the front longitudinal beam 20 and the upper side beam 30 are connected to the energy-absorbing box 40 to avoid vacancy on an outer side of the front longitudinal beam 20.

Figure 8:
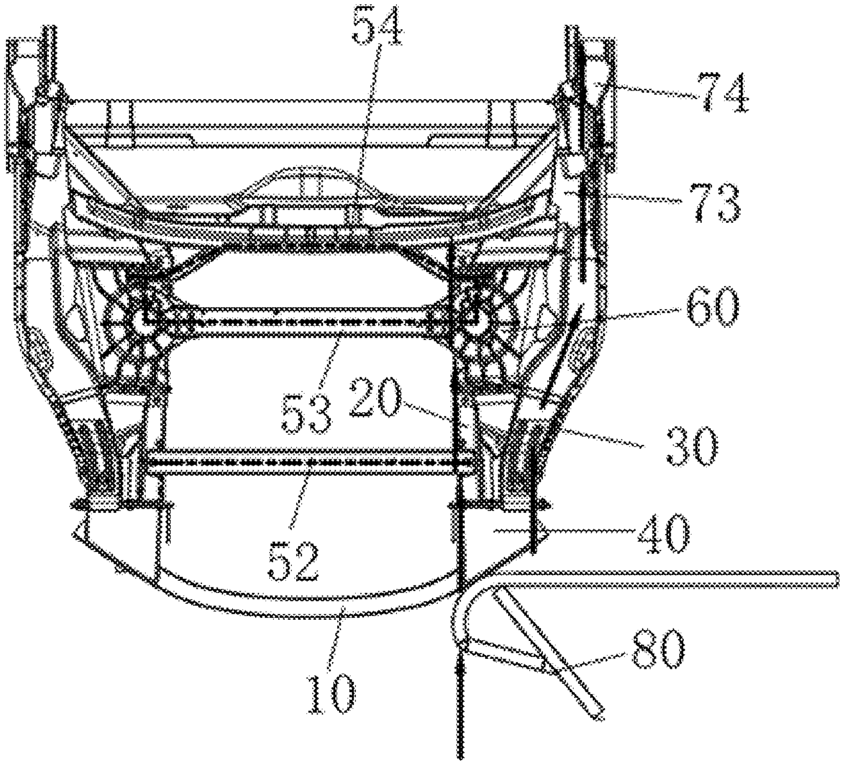
FIG. 8 is a collision force transmission diagram of a vehicle front compartment structure according to an embodiment of the present disclosure.
Figure 9:
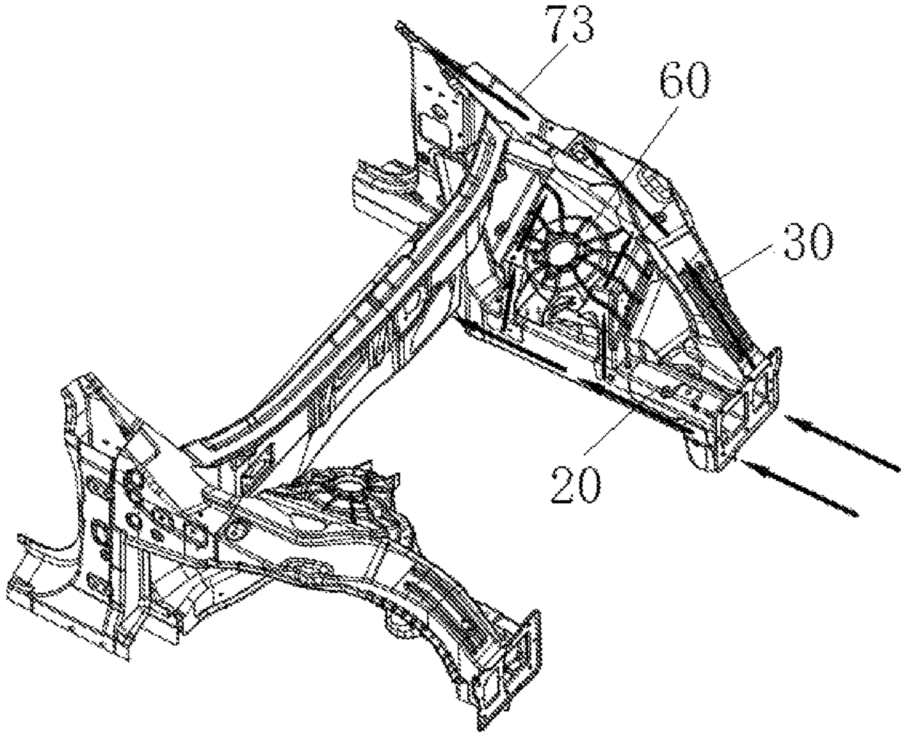
FIG. 9 is another collision force transmission diagram of a vehicle front compartment structure according to an embodiment of the present disclosure.

As shown in FIG. 8 and FIG. 9, the first force transmission structure is formed through the front anti-collision beam 10, the energy-absorbing box 40, and the upper side beam 30. When the vehicle encounters a collision, a part of collision force is transmitted to the A-pillar 72 along a top force transmission path of the vehicle through the first force transmission structure. The second force transmission structure is formed through the front anti-collision beam 10, the energy-absorbing box 40, and the front longitudinal beam 20, and another part of collision force may be transmitted to a chassis of the vehicle along a bottom force transmission path of the vehicle through the second force transmission structure. A width of the energy-absorbing box 40 is increased, and both the upper side beam 30 and the front longitudinal beam 20 are connected to the energy-absorbing box 40, to enlarge the overlap area between the energy-absorbing box 40 on the front anti-collision beam 10 and a collision barrier, so that the first force transmission structure that has the top force transmission path and the second force transmission structure that has the bottom force transmission path (the force transmission paths are shown as directions indicated by arrows in FIG. 8 and FIG. 9) are formed while the energy-absorbing box 40 absorbs collision energy. Therefore, a collision force is dispersedly transmitted, requirements of the vehicle during collisions such as a frontal collision and a small-offset collision are met, collision resistance of the vehicle is improved, and vehicle safety is improved.

In the following embodiments of the present disclosure, the Y direction may be understood as a width direction of the vehicle or a length direction of a first connecting rod 52, an X direction may be understood as a length direction of the front longitudinal beam 20 or a length direction of the vehicle, and a Z direction may be understood as a height direction of the vehicle. The first force transmission path of the present disclosure can effectively cope with the small-offset collision and ensure collision force transmission during the collision. The second force transmission path can serve as a main force transmission path, to undertake collision force transmission of the vehicle during the frontal collision and the small-offset collision.

Therefore, in the vehicle front compartment structure 100 according to this embodiment of the present disclosure, the width of the energy-absorbing box 40 is increased, and both the upper side beam 30 and the front longitudinal beam 20 are connected to the energy-absorbing box 40, to enlarge the overlap area between the energy-absorbing box 40 on the front anti-collision beam 10 and the collision barrier, so that the first force transmission structure that has the top force transmission path and the second force transmission structure that has the bottom force transmission path are formed while the energy-absorbing box 40 absorbs collision energy. Therefore, the collision force is dispersedly transmitted, the requirements of the vehicle during the collisions such as the frontal collision and the small-offset collision are met, the collision resistance of the vehicle is improved, and vehicle safety is improved.

According to an embodiment of the present disclosure, in a first direction, widths of cross sections of ends that are of the front longitudinal beam 20 and the upper side beam 30 and that face the front anti-collision beam 10 are less than or equal to a width of a cross section of the energy-absorbing box 40; and a bottom surface of the end that is of the upper side beam 30 and that faces the front anti-collision beam 10 is flush with a bottom surface of the energy-absorbing box 40.

Figure 4:
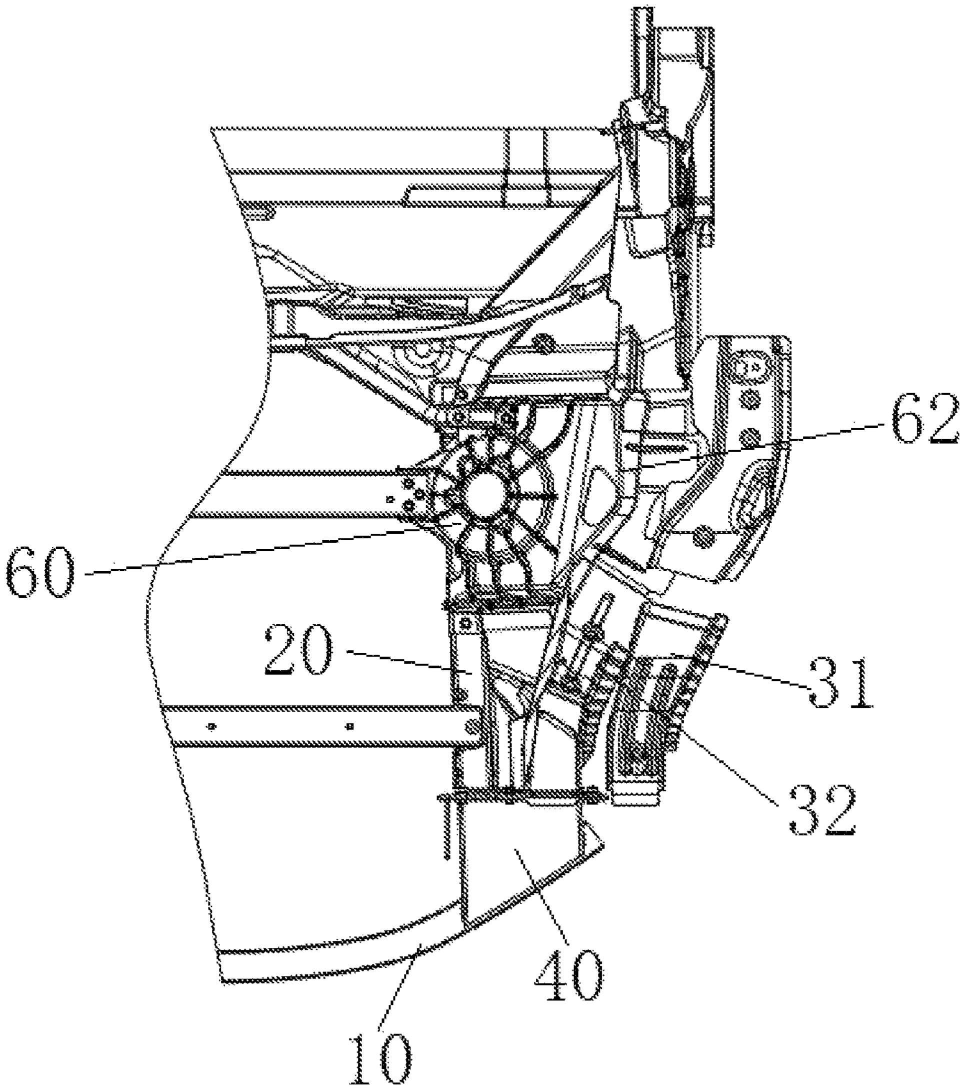
FIG. 4 is a structural exploded view of an upper side beam of a vehicle front compartment structure according to an embodiment of the present disclosure.

That is, as shown in FIG. 1 and FIG. 4, in the first direction, the widths of the cross sections of the ends (front sections of the front longitudinal beam 20 and the upper side beam 30) that are of the front longitudinal beam 20 and the upper side beam 30 and that face the front anti-collision beam 10 are less than or equal to the width of the cross section of the energy-absorbing box 40. The first direction may be understood as the width direction (the Y direction) of the vehicle, a shape of a side that is of the energy-absorbing box 40 and that faces the front anti-collision beam 10 corresponds to a curved shape of the front anti-collision beam 10, and the bottom surface of the end that is of the upper side beam 30 and that faces the front anti-collision beam 10 is flush with the bottom surface of the energy-absorbing box 40. Optionally, in the first direction, the width of the energy-absorbing box 40 is equal to a sum of the widths of the front longitudinal beam 20 and the upper side beam 30, that is, sizes of the cross sections of the ends that are of the front longitudinal beam 20 and the upper side beam 30 and that face the front anti-collision beam 10 can be roughly equivalent to a size of the cross section of the energy-absorbing box 40, to ensure that, when the vehicle encounters the collision, the energy-absorbing box 40 performs crumple energy absorption on a generated collision force, and the remaining collision force can be dispersed to the two force transmission paths including the front longitudinal beam 20 and the upper side beam 30. In this way, a collision force transmission effect is ensured.

In the present disclosure, the upper side beam 30 extends toward the A-pillar, and the upper side beam 30 is connected to the A-pillar, to form the force transmission channel between the upper side beam 30 and the A-pillar 72, so that an impact force is transmitted to the A-pillar 72 through the first force transmission structure. Therefore, the collision resistance of the vehicle is improved, and vehicle safety is improved.

According to an embodiment of the present disclosure, the upper side beam 30 includes: a support plate 51, where the support plate 51 is arranged on a side that is of the front longitudinal beam 20 and that faces the upper side beam 30, and the support plate 51 is arranged between the energy-absorbing box 40 and the upper side beam 30, to transmit the impact force to the upper side beam 30.

Figure 3:
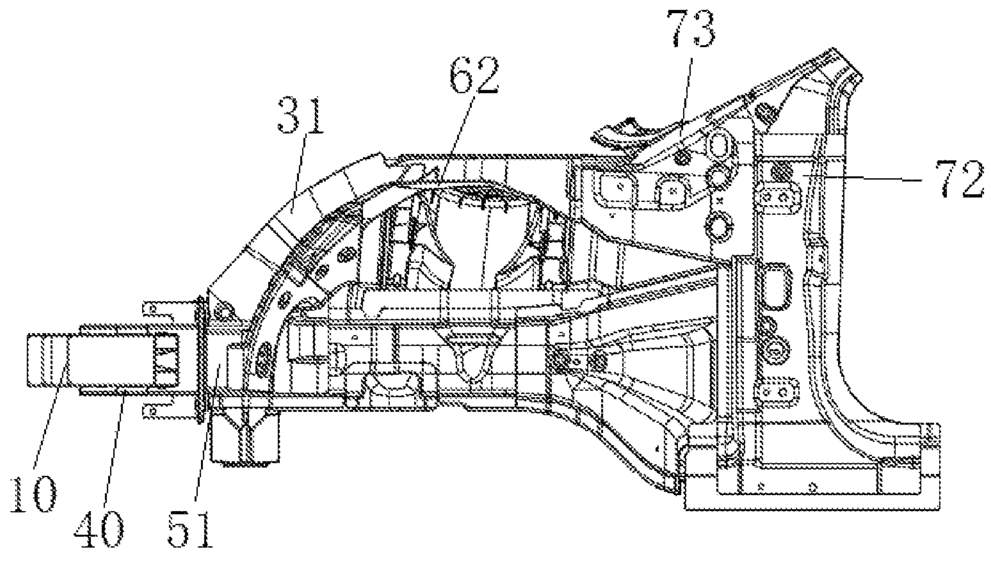
FIG. 3 is another top view of a vehicle front compartment structure according to an embodiment of the present disclosure.

In other words, refer to FIG. 1 and FIG. 3, the upper side beam 30 is further provided with the support plate 51. The support plate 51 is arranged on the side that is of the front longitudinal beam 20 and that faces the upper side beam 30, that is, the support plate 51 is arranged on an outer side that is of the front longitudinal beam 20 and that faces the vehicle. The support plate 51 is located between the energy-absorbing box 40 and the upper side beam 30. The support plate 51 fully fills vacant regions that are of the front longitudinal beam 20 and the upper side beam 30 and that face the front anti-collision beam 10. When the vehicle encounters the collision, the support plate 51 may obliquely transmit the impact force to the upper side beam 30, and disperse the impact force to the A-pillar 72 through a connecting plate 73 on the A-pillar 72, to form the top force transmission path. Therefore, collision resistance of the front anti-collision beam 10 is improved, and driving safety is improved.

According to an embodiment of the present disclosure, the upper side beam 30 further includes: a first beam body 31 and a second beam body 32, where the first beam body 31 is arranged above the second beam body 32, the first beam body 31 and the second beam body 32 fit with each other to define an energy-absorbing cavity, and the second beam body 32 is connected to the energy-absorbing box 40 through the support plate 51.

That is, as shown in FIG. 1 to FIG. 4, each upper side beam 30 mainly includes the first beam body 31 and the second beam body 32. The first beam body 31 is arranged above the second beam body 32 (refer to FIG. 2 and FIG. 4). The first beam body 31 and the second beam body 32 fit with each other to define the energy-absorbing cavity. The support plate 51 is lap-jointed with the second beam body 32. The support plate 51 is connected to the energy-absorbing box 40. The first beam body 31 can cover the support plate 51 and the second beam body 32. The first beam body 31 and the second beam body 32 are buckled with each other from top to bottom to form a hollow structure. In this way, the energy-absorbing cavity is defined and an energy-absorbing effect of the upper side beam 30 is effectively improved. Widths of the energy-absorbing cavity of the upper side beam 30 and an energy-absorbing cavity of the front longitudinal beam 20 are equivalent to a size of an energy-absorbing cavity of the widened energy-absorbing box 40, to further ensure the collision force transmission effect.

In some specific implementations of the present disclosure, the vehicle front compartment structure 100 further includes: a wheel housing 60, the wheel housing 60 being separately connected to the front longitudinal beam 20 and the upper side beam 30, the wheel housing 60 being located between the front longitudinal beam 20 and the upper side beam 30, and the first force transmission structure being formed through the front anti-collision beam 10, the energy-absorbing box 40, the upper side beam 30, and the wheel housing 60, to transmit the impact force to the A-pillar 72. Each wheel housing 60 is provided with a first flange 61 and a second flange 62, the first flange 61 is connected to the front longitudinal beam 20, and the second flange 62 is connected to the second beam body 32. A shock absorption cavity 63 is defined between the first flange 61 and the front longitudinal beam 20, and a shock absorption cavity 63 is defined between the second flange 62 and the upper side beam 30.

Figure 6:
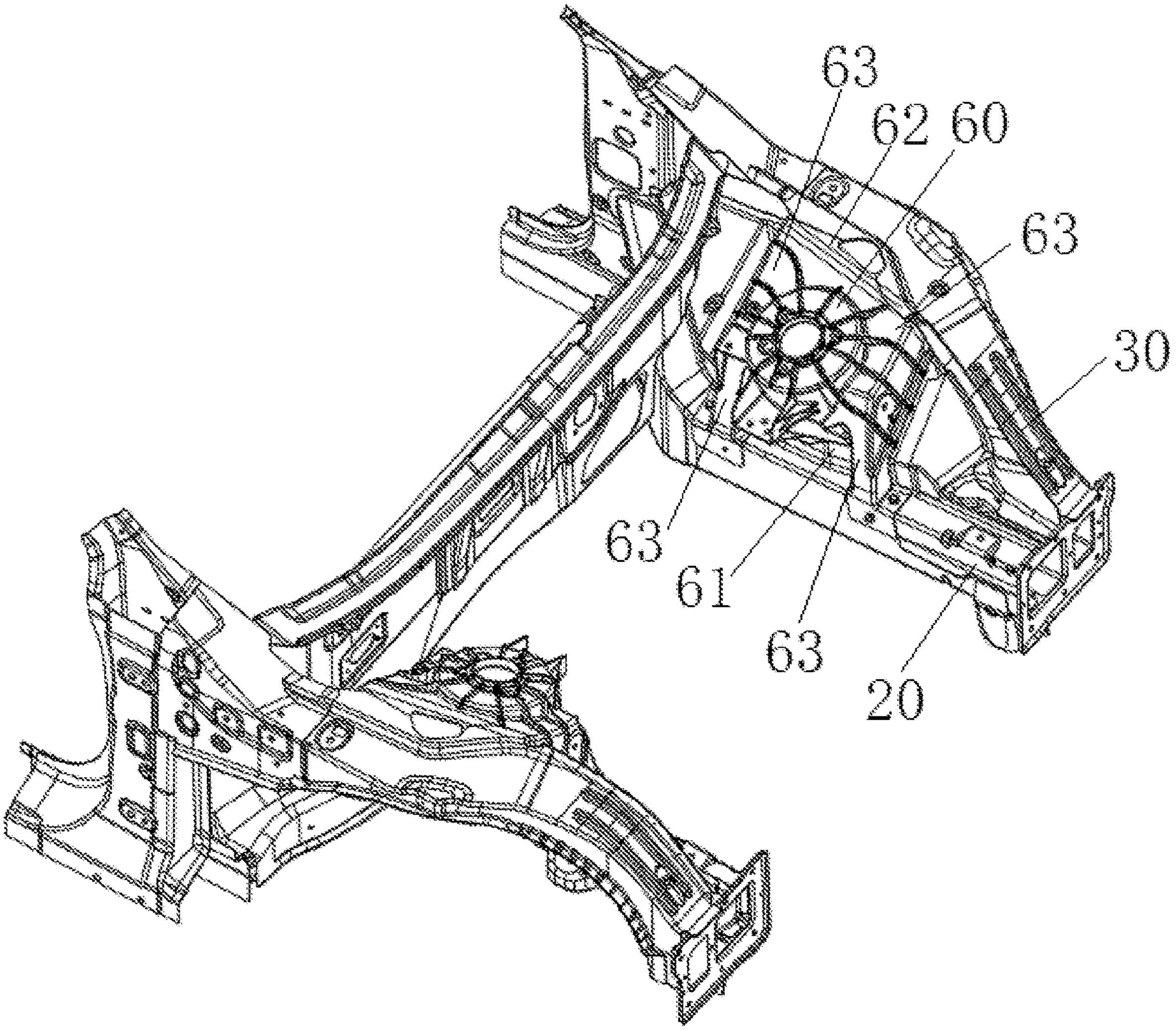
FIG. 6 is a structural diagram of a wheel housing of a vehicle front compartment structure according to an embodiment of the present disclosure.
Figure 7:
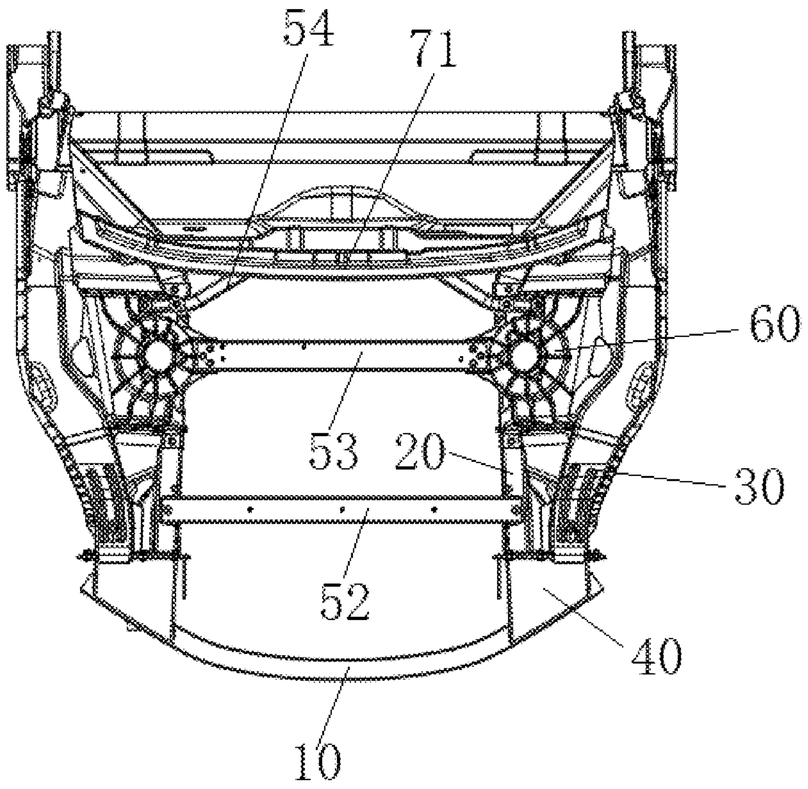
FIG. 7 is a top view of a wheel housing of a vehicle front compartment structure according to an embodiment of the present disclosure.

In other words, as shown in FIG. 1, FIG. 6, and FIG. 7, the vehicle front compartment structure 100 further includes the wheel housing 60. Two wheel housings 60 from the left to the right are arranged opposite to each other on a side that is of the front longitudinal beam 20 and that is far away from the front anti-collision beam 10. A wheel is arranged below the wheel housing 60. Each wheel housing 60 is connected to the upper side beam 30. The wheel housing 60 is located between the front longitudinal beam 20 and the upper side beam 30. The width of the energy-absorbing box 40 is increased on an outer side of the energy-absorbing box 40. Orientations such as "outer side" and "behind" described in the present disclosure are based on an orientation of the vehicle. The front longitudinal beam 20 is connected and assembled behind the energy-absorbing box 40, the support plate 51 is welded to the outer side of the front longitudinal beam 20, the second beam body 32 in the upper side beam 30 is lap-jointed behind the support plate 51, the wheel housing 60 obtained through aluminum casting is lap-jointed on a left side of the second beam body 32, the wheel housing 60 may be screwed between the front longitudinal beam 20 and the second beam body 32, and the upper side beam 30 is connected to the A-pillar 72 through the connecting plate 73 of the A-pillar 72. A Z-direction height plane a is an upper top end surface of the front anti-collision beam 10, a front end of a lower section (the second beam body 32) of the upper side beam 30 is lap-jointed with the upper top end surface of the front anti-collision beam 10, and the upper side beam 30 is gradually raised from the front end in the Z direction and is lap-jointed with the wheel housing 60 obtained through aluminum casting.

The first force transmission structure is formed through the front anti-collision beam 10, the energy-absorbing box 40, the upper side beam 30, and the wheel housing 60. An upper section (the first beam body 31) of the upper side beam 30 covers the support plate 51 and the lower section (the second beam body 32) of the upper side beam 30 in the Z direction (the height direction of the vehicle), and forms a cavity together with the support plate 51, the second beam body 32, and the wheel housing 60, and the cavity serves as a small-offset collision force transmission path, to transmit, to the A-pillar 72, the collision force transmitted from the front anti-collision beam 10.

Optionally, refer to FIG. 6, each wheel housing 60 is provided with a first flange 61 and a second flange 62, the first flange 61 is connected to the front longitudinal beam 20, and the second flange 62 is connected to the second beam body 32. A shock absorption cavity 63 is defined between the first flange 61 and the front longitudinal beam 20, and a shock absorption cavity 63 is also defined between the second flange 62 and the upper side beam 30. The wheel housing 60 obtained through aluminum casting may be riveted on the front longitudinal beam 20, the wheel housing 60 is integrated with the first flange 61 and the second flange 62, and a front end of the wheel housing 60 (an end that faces the front anti-collision beam 10) has two shock absorption cavities 63 arranged opposite to each other. A rear end of the wheel housing 60 has two shock absorption cavities 63 arranged opposite to each other. The first flange 61 of the wheel housing 60 may be straddled on the front longitudinal beam 20, and located on an inner side of a facade of the front longitudinal beam 20, and the second flange 62 of the wheel housing 60 can be lap-jointed with the upper side beam 30. The two groups of shock absorption cavities 63 in the front and rear of the wheel housing 60 can facilitate assembly of shock absorbers, improve dynamic stiffness of the shock absorbers, improve vehicle handling, and simultaneously serve as collision force transmission paths.

In some specific implementations of the present disclosure, two front longitudinal beams 20 extend in a direction toward the front anti-collision beam 10, and a width distance between the two front longitudinal beams 20 gradually increases to form a splayed structure. The vehicle front compartment structure 100 further includes: a first connecting rod 52 and a second connecting rod 53, the first connecting rod 52 being arranged between the two front longitudinal beams 20, the second connecting rod 53 being arranged between the two wheel housings 60, the first connecting rod 52 being close to the front anti-collision beam 10 relative to the second connecting rod 53, the first connecting rod 52, the two front longitudinal beams 20, and the second connecting rod 53 enclosing a first closed loop, and the second connecting rod 53, the two front longitudinal beams 20, and a cowl panel 71 enclosing a second closed loop. The vehicle front compartment structure 100 further includes: a third connecting rod 54, the third connecting rod 54 being separately connected to the front longitudinal beam 20 and the cowl panel 71, and the second connecting rod 53, the two wheel housings 60, and the third connecting rod 54 enclosing the second closed loop.

Figure 5:
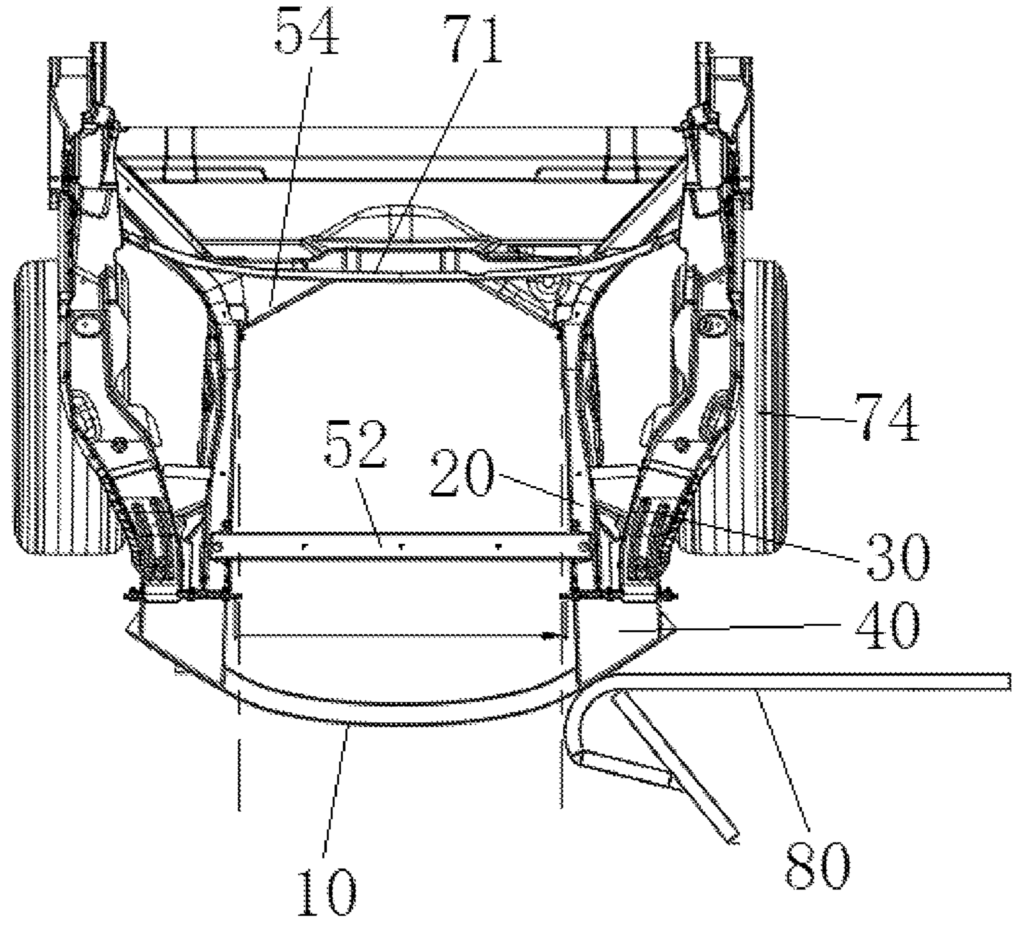
FIG. 5 is a deflected view of a front longitudinal beam of a vehicle front compartment structure according to an embodiment of the present disclosure.

That is, refer to FIG. 5, the two front longitudinal beams 20 are symmetrically arranged, the two front longitudinal beams 20 are in the extension direction toward the front anti-collision beam 10, and a distance between the two front longitudinal beams 20 gradually increases to form a splayed structure. Because a tail part of the front longitudinal beam 20 (an end far away from the front anti-collision beam 10) needs to avoid a tire 74, the front longitudinal beams 20 arranged in the splayed shape can facilitate reserving a spatial position for the tire 74 when the vehicle steers. An engine or a motor assembly may be placed above a middle part of the front longitudinal beam 20, a front end of the front longitudinal beam 20 is connected to the front anti-collision beam 10. A front section of the front longitudinal beam 20 undertakes an arrangement function and serves as a main force transmission path, to undertake collision force transmission of the vehicle during the frontal collision and the small-offset collision.

In a conventional structure, the front sections of the two front longitudinal beams 20 are arranged in parallel. In an arrangement manner of the front longitudinal beams 20 in the related art, the front anti-collision beam 10 connected to the front section of the front longitudinal beam 20 absorbs energy at a boundary line of a small-offset collision barrier, and the energy-absorbing box 40 is directly opposite to a rounded corner of the barrier. In the new structure of the present disclosure, the tail parts of the two front longitudinal beams 20 need to avoid the tires 74, and the front end of each front longitudinal beam 20 is 3° to 5° outward relative to the tail part to form the splayed structure (shown as dashed lines in FIG. 5). In this new arrangement, the new arrangement is inclined at an angle θ relative to the old arrangement, and the energy-absorbing box 40 behind the front anti-collision beam 10 is directly opposite to a straight-line section part of the collision barrier 80. In this way, the overlap area between the energy-absorbing box 40 and the collision barrier 80 is enlarged, to ensure collision force transmission during the collision.

As shown in FIG. 7 and FIG. 8, the vehicle front compartment structure 100 further includes the first connecting rod 52 and the second connecting rod 53. The first connecting rod 52 serves as a front compartment cross beam. The first connecting rod 52 is arranged between the two front longitudinal beams 20. The second connecting rod 53 is arranged between the two front longitudinal beams 20. The first connecting rod 52 is close to the front anti-collision beam 10 relative to the second connecting rod 53. The second connecting rod 53 is arranged between the two wheel housings 60. The first connecting rod 52, the two front longitudinal beams 20, and the second connecting rod 53 enclose the first closed loop, and the second connecting rod 53, the two front longitudinal beams 20, and the cowl panel 71 enclose the second closed loop (shown as dashed lines in FIG. 8). The design in which the wheel housing 60 obtained through aluminum casting is straddled on the front longitudinal beam 20 and there are two closed loops is conducive to improving dynamic stiffness of an installation point of a front shock absorber and dynamic stiffness of a vehicle body, and improving vehicle handling.

The vehicle front compartment structure 100 further includes the third connecting rod 54. The third connecting rod 54 is arranged at the end that is of the front longitudinal beam 20 and that is far away from the front anti-collision beam 10. The third connecting rod 54 is connected to the cowl panel 71. A shape of the third connecting rod 54 corresponds to a curved shape of the cowl panel 71. Two ends of the third connecting rod 54 are respectively lap-jointed with the two wheel housings 60, and a middle section of the third connecting rod 54 is lap-jointed with the cowl panel 71. The second connecting rod 53, the two wheel housings 60, and the third connecting rod 54 enclose the second closed loop. The design in which the wheel housing 60 obtained through aluminum casting is straddled on the front longitudinal beam 20 and there are two closed loops is conducive to improving dynamic stiffness of an installation point of a front shock absorber and dynamic stiffness of a vehicle body, and improving vehicle handling.

In a vehicle collision force transmission process of the present disclosure, as shown in FIG. 8 and FIG. 9, the first force transmission structure and the second force transmission structure form a top path and a bottom path. In frontal 100% overlap and small-offset collisions, the front anti-collision beam 10 is collided with the collision barrier 80, the widened energy-absorbing box 40 performs crumple energy absorption, and the support plate 51 at a rear end of the energy-absorbing box 40 obliquely transmits the impact force to the upper side beam 30 and the connecting plate 73, and transmits and disperses the impact force to the A-pillar 72, to form the top force transmission path (refer to the directions indicated by the arrows in FIG. 8 and FIG. 9). The energy-absorbing box 40 and the front longitudinal beam 20 form the bottom force transmission path, and a part of impact force is dispersed to a right wheel housing 60 through the first connecting rod 52, the second connecting rod 53, and the third connecting rod 54.

In the present disclosure, the force transmission paths of the front compartment of the vehicle are redesigned, to add a force transmission path to the pure electric vehicle for an offset collision, and a key structure on the path is designed and optimized in detail. In addition, a trend and a span of the front longitudinal beam 20 are rearranged, and an associated structure and a connection relationship between the energy-absorbing box 40 on the front anti-collision beam 10 and the upper side beam 30 are optimized. Based on this, related structures such as the upper side beam 30, the wheel housing 60, the first connecting rod 52, the second connecting rod 53, and the third connecting rod 54 are optimized and designed to improve the collision resistance of the front anti-collision beam 10. In addition, structures such as the upper side beam 30 and the front longitudinal beam 20 fit with each other to form a cavity with a closed cross section, to form two closed loops and two force transmission paths. Therefore, transmission, decomposition, and resistant capabilities for the impact force are improved, structural stiffness during shock absorber installation is improved, driving quality of the vehicle is improved, the vehicle is actively guided to slide to a Y-direction side during the collision, and vehicle and occupant safety is ensured.

In the present disclosure, there is no specific limitation on materials, cross-sectional shapes, connection manners, and the like of the structures such as the front longitudinal beam 20, the upper side beam 30, the first connecting rod 52, the second connecting rod 53, the third connecting rod 54, and the wheel housing 60 in the vehicle front compartment structure 100, and any design that can meet collision requirements of the present disclosure shall fall within the protection scope of the present disclosure.

Certainly, another structure and another operation principle in the vehicle front compartment structure 100 can be understood and implemented by a person skilled in the art. Details are not described in detail in the present disclosure.

In conclusion, in the vehicle front compartment structure 100 according to this embodiment of the present disclosure, the width of the energy-absorbing box 40 is increased, and both the upper side beam 30 and the front longitudinal beam 20 are connected to the energy-absorbing box 40, to enlarge the overlap area between the energy-absorbing box 40 on the front anti-collision beam 10 and the collision barrier, so that the first force transmission structure that has the top force transmission path and the second force transmission structure that has the bottom force transmission path are formed while the energy-absorbing box 40 absorbs collision energy. Therefore, the collision force is dispersedly transmitted, the requirements of the vehicle during the collisions such as the frontal collision and the small-offset collision are met, the collision resistance of the vehicle is improved, and vehicle safety is improved.

An embodiment of the present disclosure further provides a vehicle, which includes the vehicle front compartment structure 100 in the foregoing embodiment. The vehicle in the present disclosure may be an electric vehicle, a fuel vehicle, or another type of hybrid vehicle. Because the vehicle front compartment structure 100 according to the embodiments of the present disclosure has the foregoing technical effects, the vehicle according to the embodiments of the present disclosure should also have the corresponding technical effects. To be specific, the vehicle in the present disclosure uses the vehicle front compartment structure 100, to enlarge the overlap area between the energy-absorbing box 40 on the front anti-collision beam 10 and the collision barrier, so that the first force transmission structure that has the top force transmission path and the second force transmission structure that has the bottom force transmission path are formed while the energy-absorbing box 40 absorbs collision energy. Therefore, the collision force is dispersedly transmitted, the requirements of the vehicle during the collisions such as the frontal collision and the small-offset collision are met, the collision resistance of the vehicle is improved, and vehicle safety is improved.

Although some specific embodiments of the present disclosure have been described in detail by way of examples, a person skilled in the art should understand that the foregoing examples are only for description and are not intended to limit the scope of the present disclosure. A person skilled in the art should understand that modifications may be made to the foregoing embodiments without departing from the scope and spirit of the present disclosure. The scope of the present disclosure is limited by the appended claims.

What is claimed is:

1. A vehicle front compartment structure, comprising:

a front anti-collision beam;

a front longitudinal beam;

an upper side beam; and an energy-absorbing box, a side of the energy-absorbing box being connected to the front anti-collision beam, and the front longitudinal beam and the upper side beam being separately connected to another side of the energy-absorbing box; a first force transmission structure being formed through the front anti-collision beam, the energy-absorbing box, and the upper side beam; and a second force transmission structure being formed through the front anti-collision beam, the energy-absorbing box, and the front longitudinal beam, wherein a front end of the front longitudinal beam is approximately 3° to 5° outward relative to a tail part of the front longitudinal beam to form a splayed structure.

2. The vehicle front compartment structure according to claim 1, wherein, in a first direction, a width of the energy-absorbing box is equal to a sum of widths of the front longitudinal beam and the upper side beam.

3. The vehicle front compartment structure according to claim 1, wherein a bottom surface of an end that is of the upper side beam and that faces the front anti-collision beam is flush with a bottom surface of the energy-absorbing box.

4. The vehicle front compartment structure according to claim 2, wherein a bottom surface of an end that is of the upper side beam and that faces the front anti-collision beam is flush with a bottom surface of the energy-absorbing box.

5. The vehicle front compartment structure according to claim 1, wherein the upper side beam extends toward an A-pillar, and the upper side beam is connected to the A-pillar, to transmit an impact force to the A-pillar through the first force transmission structure.

6. The vehicle front compartment structure according to claim 2, wherein the upper side beam extends toward an A-pillar, and the upper side beam is connected to the A-pillar, to transmit an impact force to the A-pillar through the first force transmission structure.

7. The vehicle front compartment structure according to claim 3, wherein the upper side beam extends toward an A-pillar, and the upper side beam is connected to the A-pillar, to transmit an impact force to the A-pillar through the first force transmission structure.

8. The vehicle front compartment structure according to claim 4, wherein the upper side beam extends toward an A-pillar, and the upper side beam is connected to the A-pillar, to transmit an impact force to the A-pillar through the first force transmission structure.

9. The vehicle front compartment structure according to claim 1, wherein the upper side beam comprises:

a support plate, the support plate is arranged on a side that is of the front longitudinal beam and that faces the upper side beam, and the support plate is arranged between the energy-absorbing box and the upper side beam, to transmit the impact force to the upper side beam.

10. The vehicle front compartment structure according to claim 2, wherein the upper side beam comprises:

a support plate, the support plate is arranged on a side that is of the front longitudinal beam and that faces the upper side beam, and the support plate is arranged between the energy-absorbing box and the upper side beam, to transmit the impact force to the upper side beam.

11. The vehicle front compartment structure according to claim 3, wherein the upper side beam comprises:

a support plate, the support plate is arranged on a side that is of the front longitudinal beam and that faces the upper side beam, and the support plate is arranged between the energy-absorbing box and the upper side beam, to transmit the impact force to the upper side beam.

12. The vehicle front compartment structure according to claim 4, wherein the upper side beam comprises:

a support plate, the support plate is arranged on a side that is of the front longitudinal beam and that faces the upper side beam, and the support plate is arranged between the energy-absorbing box and the upper side beam, to transmit the impact force to the upper side beam.

13. The vehicle front compartment structure according to claim 5, wherein the upper side beam comprises:

a support plate, the support plate is arranged on a side that is of the front longitudinal beam and that faces the upper side beam, and the support plate is arranged between the energy-absorbing box and the upper side beam, to transmit the impact force to the upper side beam.

14. The vehicle front compartment structure according to claim 9, wherein the upper side beam comprises:

a first beam body; and a second beam body, the first beam body is arranged above the second beam body, the first beam body and the second beam body fit with each other to define an energy-absorbing cavity, and the second beam body is connected to the energy-absorbing box through the support plate.

15. The vehicle front compartment structure according to claim 1, further comprising:

a wheel housing, the wheel housing being separately connected to the front longitudinal beam and the upper side beam, the wheel housing being arranged between the front longitudinal beam and the upper side beam, and the first force transmission structure being formed through the front anti-collision beam, the energy-absorbing box, the upper side beam, and the wheel housing.

16. The vehicle front compartment structure according to claim 15, wherein each wheel housing is provided with a first flange and a second flange, the first flange is connected to the front longitudinal beam, and the second flange is connected to the upper side beam.

17. The vehicle front compartment structure according to claim 1, further comprising:

a first connecting rod, the first connecting rod being arranged between the two front longitudinal beams; and a second connecting rod, the second connecting rod being arranged between two wheel housings, the first connecting rod being close to the front anti-collision beam relative to the second connecting rod, the first connecting rod, the two front longitudinal beams, and the second connecting rod enclosing a first closed loop, and the second connecting rod, the two front longitudinal beams, and a cowl panel enclosing a second closed loop.

18. The vehicle front compartment structure according to claim 17, further comprising:

a third connecting rod, the third connecting rod being separately connected to the front longitudinal beam and the cowl panel, and the second closed loop further includes the third connecting rod and the two wheel housings, such that the second connecting rod, the two front longitudinal beams, the two wheel housings, the third connecting rod, and the cowl panel enclosing the second closed loop.

19. A vehicle, comprising the vehicle front compartment structure according to claim 1.

* * * * *